(12) United States Patent
Segen

(10) Patent No.: US 6,252,598 B1
(45) Date of Patent: Jun. 26, 2001

(54) VIDEO HAND IMAGE COMPUTER INTERFACE

(75) Inventor: Jakub Segen, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/887,765

(22) Filed: Jul. 3, 1997

(51) Int. Cl.[7] .................................. G06F 3/02; G06K 9/62
(52) U.S. Cl. ......................... 345/358; 382/181; 345/156
(58) Field of Search .................................. 345/157, 158, 345/175, 358; 382/181, 170

(56) References Cited

U.S. PATENT DOCUMENTS

| | | | |
|---|---|---|---|
| 5,436,639 | * 7/1995 | Arai et al. ............................. | 345/156 |
| 5,454,043 | * 9/1995 | Freeman ................................ | 382/170 |
| 5,594,469 | * 1/1997 | Freeman et al. ...................... | 345/158 |
| 5,767,842 | * 6/1998 | Korth .................................... | 345/168 |

* cited by examiner

*Primary Examiner*—Raymond J. Bayerl
*Assistant Examiner*—Thomas T. Nguyen

(57) ABSTRACT

An interface method and apparatus using video images of hand gestures. A video signal having a frame image containing regions is input to a processor. A plurality of regions in the frame are defined and screened to locate an image of a hand in one of the regions. The hand image is processed to locate extreme curvature values, such as peaks and valleys, corresponding to predetermined hand positions and gestures. The number of peaks and valleys are then used to identify and correlate a predetermined hand gesture to the hand image for effectuating a particular computer operation or function.

12 Claims, 1 Drawing Sheet

VIDEO HAND IMAGE COMPUTER INTERFACE

BACKGROUND OF THE INVENTION

I. Field of the Invention

This invention pertains to a method and apparatus for inputting commands to a computer using hand signals. More particularly, the present invention relates to a video based computer interface wherein images of hand gestures are used to control a computer.

II. Description of the Related Art

Various types of computer control and interface devices exist for inputting commands to a computer. Such devices may for example take the form of a computer mouse, joystick or trackball, wherein a user manipulates the interface device to perform a particular operation such as to select a specific entry from a menu of options, perform a "click" or "point" function, etc. A significant problem associated with such interface devices is that a surface area is needed for placement of the device and, in the case of a mouse, to accommodate device movement and manipulation. In addition, such interface devices are generally connected by a cable to a computer CPU with the cable typically draped across the user's desk, causing obstruction of the user's work area. Moreover, because interface device manipulation for performing operations is not consistent with common communication movements, such as the use of a pointing finger hand gesture to select a menu entry, as opposed to maneuvering a mouse until the cursor rests on the desired menu entry, a user must become comfortable and familiar with the operation of the particular interface device before proficiency in use may be attained. Accordingly, a need exists for a computer interface wherein common and typically widely used hand gestures can be used for operation initiation and selection.

SUMMARY OF THE INVENTION

This invention relates to the use of images input to a computer for effectuating computer control. The computer contains image processing capabilities for operatively interpreting the received images. The invention may, by way of preferred example, utilize a video camera or other video input device connected to an image processing computer, with the camera positioned to receive images of an object. In particular, the object is illustratively a user's hand and the image processing capabilities act upon predetermined recognized hand gestures as computer commands. Hand images from the camera are converted to a digital format and input to the computer for processing. The results of the processing and attempted recognition of each image are sent to an application or the like for performing various functions or operations. The video input device is preferably positioned above the user's workstation pointed downward to obtain elevated views of a user's hand. The inventive method of identifying a hand gesture in an image frame is illustratively performed by conducting a region extraction step which defines a set of regions containing or possibly containing an image of a hand in a video frame of a video input signal. The set of regions in the image is then processed by a screening step which detects and selects one of the defined regions of the image as a hand image i.e. identifies one of the regions in the image as a hand. If a hand image is thereby identified, then the set of localized features of the hand image is computed from the boundary of the selected hand region. The boundary of the hand region is thereafter analyzed to correlate the boundary data with one of stored plurality of hand gestures. Once a particular gesture is determined or identified in the frame, an application or operation associated with the identified gesture is performed by or under the control of the computer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

The hand image video interface method described hereinbelow may be used to augment or replace other common forms of computer input devices such as a computer mouse, joystick, or trackball and provides important advantages over such devices. For example, by using a live video input of hand gesture images, no contact is required between a user's hand and the input device. The user's hand is free to rest on a surface, such as a desk top, or to move freely in air, or to remain close to the keyboard so long as an image of the hand may be obtained from a video input device, which may be located several meters away from the user's hand. The present invention thus lessens the number of encumbrances around a user's workstation. The use of hand images for controlling computer operations is further beneficial because it accommodates three dimensional motion, as compared to the two dimensional motion of a joystick, trackball or mouse. As a result, three continuous parameters, each representing a motion coordinate (x, y, z), can be simultaneously controlled. In addition, the use of hand gestures for computer control is more natural than user-effective movement of a mouse, joystick, or trackball because commonly used hand gestures, which are often already known by a user, can be employed.

Figure 1:
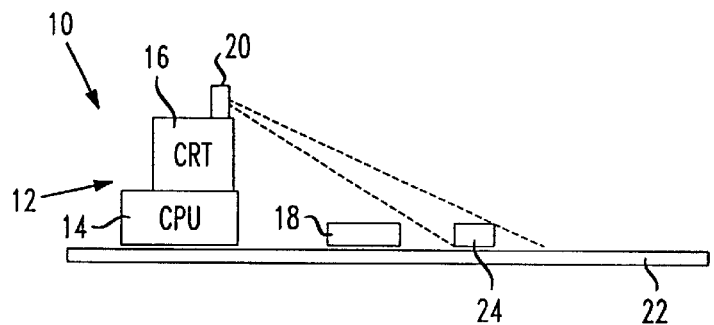
FIG. 1 is a block diagram of a video hand image computer interface in accordance with the present invention.

Turning now to the drawings and initially to FIG. 1 thereof, an apparatus 10 for hand image computer interfacing in accordance with the invention is depicted. As shown, the apparatus includes a generally conventional computer workstation 12 including a central processing unit (CPU) 14, a cathode ray tube (CRT) screen 16, and a keyboard 18 for inputting data to the computer workstation 12. The computer workstation is shown positioned on a surface 22, such as a table or desk top, and a video input device, such as a video camera 20, is shown mounted atop the CRT 16 and positioned for obtaining images of an object 24 located proximate or above surface 22. As is known in the art, camera 20 inputs images to the computer 12 in the form of a continuous video signal formed of a series of successive-in-time frames, with each frame comprised of a plurality or matrix of pixels that are divided into macro blocks. Although it is preferred that the camera 20 be positioned as shown in FIG. 1 to obtain elevated images of the object 24, which in the preferred embodiment is a user's hand, camera 20 may alternatively be positioned or adjustable to receive other views of the object. In particular, in the event that surface 22 is constructed of a transparent material, then camera 20 may be disposed below surface 22 for obtaining images of object 24 from under the object.

When a video image of object 24 is received by the video input means 20, it is converted to a video signal which is fed to a processor, preferably contained in the CPU 14, for processing the video signal to identify gestures made by the object (e.g. a hand) so that operations corresponding to the identified gestures can be conducted. For example, a pointing gesture may be used to highlight a selection from a menu, and a "click" gesture, such as a fist, may be used to select the highlighted section.

Figure 2:
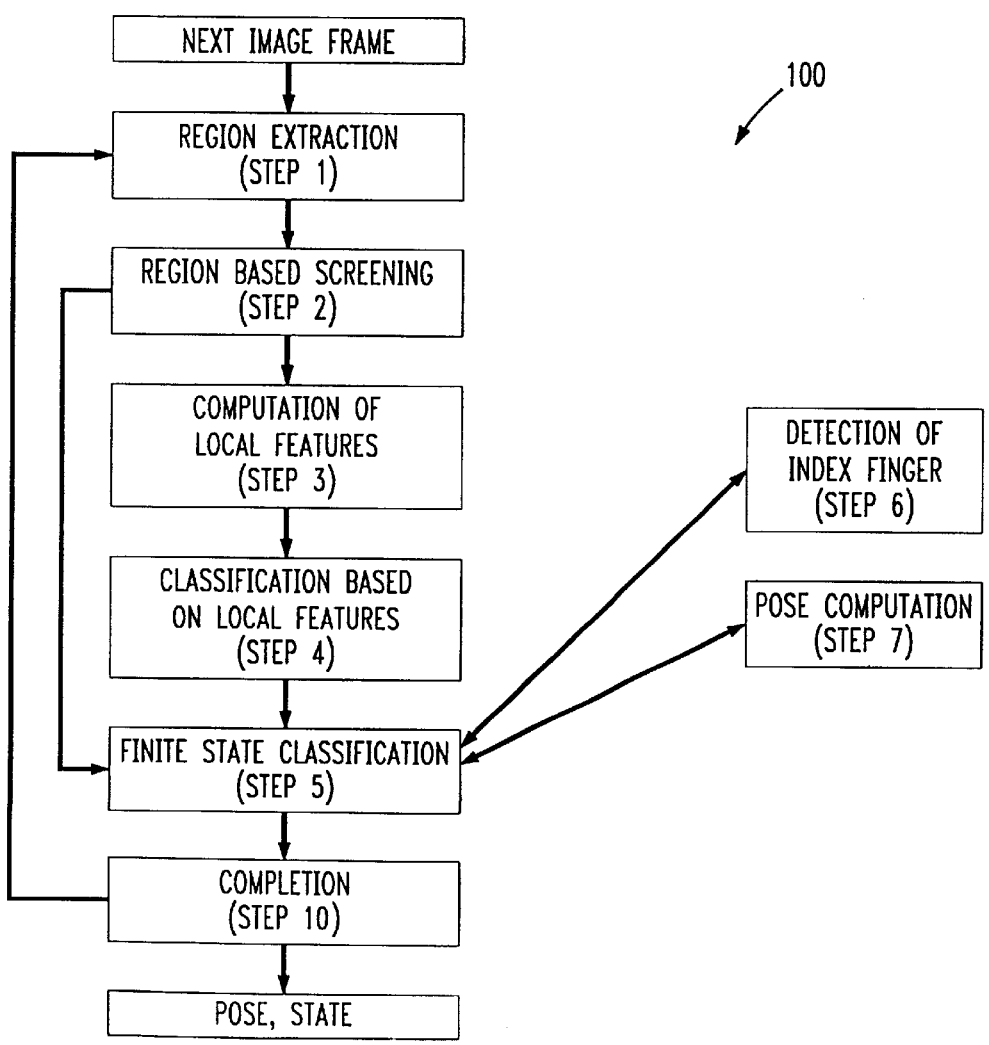
FIG. 2 is a flow chart of the steps employed in a preferred form of the hand gesture video image interface method of the present invention.

With reference to FIG. 2, a gesture identification process 100 in accordance with a preferred embodiment of the present invention will now be described. As shown, the process includes ten steps which are designated as step 1 to step 10. For each video signal frame input to the CPU by camera 20, a region extraction step (step 1) is performed for defining a plurality of regions in the object image contained in the current frame, i.e. in the frame currently being processed by the CPU. Each region is encompassed or enclosed or bounded by a boundary of pixels with each region being represented by its respective boundary. The presently preferred technique for defining regions is by calculating the difference or absolute difference between the pixel intensity value I(x, y), and another value B(x, y), and comparing that difference to a threshold constant T. The indices x and y identify the pixel coordinates in a video frame, and B(x, y) may be either a constant or a representation of the intensity at a pixel location obtained from a previous or earlier-in-time received image or image frame. If the difference or absolute difference between pixel pairs is greater than the threshold constant T, then the pixel pair will indicate a boundary pixel to be assigned to a common image region.

Although the difference or absolute difference between pixel intensity values is the presently preferred technique for defining boundaries and corresponding image regions, other techniques may also be used. For example, the regions of an image may be defined according to a color criteria wherein pixel colors are grouped together utilizing their color values. In the alternative, a combination of grouping pixels by color values and by the difference or absolute difference in intensity values may be employed in the region extraction step of method 100 to define the image regions in each video frame.

Once the regions of an image for a subject frame are defined in step 1, the defined regions are screened (step 2) to determine if one or more of the regions contains or resembles a hand. This is performed by comparing the region boundary lengths to a size range. The size range can be prestored values of band sizes which are stored in the CPU 14. In the alternative, the dimensions of a particular user's hand can be input during a training procedure conducted by the user prior to employment of the device 10. If only one of the extracted region boundary lengths falls within a preset range, e.g. between two fixed or predetermined values $T_1$ and $T_2$—which is usually the case with camera 20 focused on a user's hand—then that region is selected and passed on to step 3. Otherwise, as shown in FIG. 2, if the boundary length of more than one region falls within the preset range, a finite state classification step (step 5) is performed.

In step 3, a computation of the local features of the selected image region is performed. As is known in the art, the boundary of a region can be represented as an ordered list of pixel positions [x(i), y(i)], or [P(i)], where P(i)=x(i), y(i). The local features for the boundary region are computed by measuring the curvature at various points on the boundary. In the preferred embodiment, the curvature is defined as an angle C(i) between two vectors [P(i−k), P(i)] and [P(i), P(i+k)] which are computed for each index (i), where k is a constant. Smoothing of the boundary and curvature sequences, such as by averaging curvature values, may then be performed. The local extreme values in the curvature sequences are next identified for defining maximum curvatures which may, for example, correspond to contours of a hand, of fingers, etc. The extreme values are then grouped into two categories denoted "peaks" and "valleys". Peaks are defined as features having a positive or convex boundary with a value greater than a fixed threshold value PThr. Valleys are defined as features having a negative or concave curvature or boundary with a value less than a fixed threshold value VThr.

In the preferred embodiment, local features are computed in two stages to reduce processing demands or computational load. In the first stage, local features are computed on a boundary and sampled by a constant factor of K. Among these features, the features having a curvature greater than a constant SPThr, or less than a constant SVThr, are initially selected. In the second stage, local features are re-computed using the original boundary positions of the features selected in the first stage.

Once the computation of local features (step 3) has been completed, a classification of the local features is carried out in step 4. The classification features in step 4 is performed by evaluating the number of peaks (Npeaks) and the number of valleys (Nvalleys). The result of this classification step, which is referred to as "CLASS", is (by way of illustrative example) a categorization of the features into one of four values, namely, "ground", "point", and "reach", corresponding to different predetermined hand gestures for computer control. CLASS is a function of the number of peaks and number of valleys. By defining the maximum value of Npeaks as "MP", and the maximum number of Nvalleys as "MV", then the CLASS function can be defined by a table with (MP+1) * (MV+1) entries. In the preferred embodiment, and continuing to use by way of example, four possible values of the CLASS feature, the CLASS function is defined as follows:

If Nvalleys is <3 and Npeaks=1 or Npeaks=2, then CLASS="point"; otherwise

If Npeaks is >2 or Nvalleys>2, then CLASS="reach", otherwise CLASS="ground".

Once the classification based on local features has been performed in step 4, a finite state classification ("STATE") step (step 5) is carried out to identify and classify the detected hand gestures or "POSE". The finite state classification step updates the values of STATE and POSE based on previously calculated values of STATE, CLASS, the region boundary, and local features calculated from step 4. STATE is a discreet variable which is assigned one of (by way of illustrative example) five values, namely, "Ground", "Reach", "Point" and "Click". POSE is a list of (by way of example) three numbers: (O X Y), where O represents orientation, and X, Y are the coordinates of position on a plane. POSE is updated for certain values of CLASS. The classification step 5 is performed as follows:

If CLASS="ground", then STATE="Ground", and the method 100 proceeds to step 10, and then to step 1 for performing region extraction on the next image frame.

If CLASS="reach" and if either STATE="Reach" or "Click" then STATE="Click", otherwise STATE= "Reach", and the method 100 proceeds to step 10 for completion;

If CLASS="point", then the method proceeds to step 6 for possible detection of an index finger; if an index finger is found, then the index IndF of the local feature that is nearest to the tip of the index finger is returned. If an index finger is not located, on the other hand, then step 6 returns the index NULL. In the event that step 6 returns a "NULL", then STATE="Ground", and the method proceeds to step 10. If step 6 does detect an index finger, then step 7 is performed for computing the particular pose or gesture of the hand, using the value of IndF calculated in step 6.

Where step 7 returns a "NULL", then STATE="Ground", and the method proceeds to step 10. Otherwise, STATE="Point", and the method proceeds to step 10.

As stated above, if the CLASS variable from step 5 indicates a "point" condition, then step 6 is performed to detect the presence of an index finger. Given a boundary of length Npoints defined by the number of points in a hand image, a variable CNORM(x) is defined as:

If x+1 is >Npoints, then CNORM(x)=x−Npoints;

if x<0, then CNORM(x)=x+Npoints;

otherwise, CNORM(x)=x.

Using the variable CNORM(x), a local feature representative of the tip of an extended index finger is searched for among the calculated peaks from step 3 as follows:

If only a single peak is found, then the location index of that peak is identified as the index finger. If, however, two peaks are found (labelled A and B), then:

For a right hand object 24, if CNORM(A−B)<Npoints/2 then A is returned as the index finger, i.e. the index or location of the peak A is returned as the index finger; otherwise the index or location of peak B is returned as the index finger. If a left hand object 24 is used, however, and two peaks (A and B) are detected, then the peak corresponding to the index finger is calculated in accordance with the condition that if CNORM (A−B)<Npoints/2, then the location of peak B is returned as the index finger; otherwise, the location of peak A is used. If there is no peak detected or if more than two peaks are detected, then a NULL signal is returned to the finite state classification step (step 5), indicating that an index finger cannot be detected.

Where an index finger is detected, the index IndF representing the local feature closest to the tip of the index finger is forwarded to step 7 to compute the particular pose or gesture performed by the hand. This is done by using the boundary index IndF of the peak nearest the tip of the index finger which is calculated from step 6, and a list of midpoints [Q(i)] is extracted from the boundary using the following equation:

$$Q(i) = \frac{P(CNORM(IndF - V - i)) + P(CNORM(Indf + V + i))}{2}$$

where V is a constant value, and i varies from zero to a constant K. A straight line L is then fitted to the points Q(i), using any line fitting technique known to those having ordinary skill in the art, such for example as a least square fit calculation. A point $P_p=(X_p, Y_p)$ which is nearest to the boundary index IndF, where the line L crosses the boundary, is then found. The pose is the list of three numbers (O $X_p$ $Y_p$), where O is the orientation of the line L pointing outside the boundary. The pose location is identified by the point $(X_p, Y_p)$, and the pose orientation is determined by the value O.

Finally, a completion step (step 10) is performed wherein the STATE and POSE values are provided to an application, whereupon step 1 is again performed on the next frame. The applications can be any type of computer controlled application or operation which is assigned to one of the poses detectable by the inventive method. For example, a "point" pose or gesture may indicate that a page down or previous page operation is to be performed on a text file currently accessed by a user.

As should by now be appreciated, the heretofore-described method allows a user to interface with a computer using common or widely recognized hand gestures. These hand gestures may be used, in lieu of or to supplement a mouse, trackball, joystick, or other conventional interface device, to effectuate control of computer operations and applications.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, although the preferred embodiment employs images of a hand to effectuate computer control, images of other objects may, likewise, be employed such, for example, as images of a pencil or other pointing-type object to mark or designate menu entries or features on a computer screen, etc. Accordingly, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method of controlling a computer using images of predetermined hand gestures identified in frames of a video signal, comprising the steps of:

inputting to a processor a current video frame of a video signal containing a frame image;

defining a plurality of regions in the current video frame image with each defined region being represented by a corresponding boundary of pixels;

screening each of the corresponding boundaries of the defined regions to identify one of said defined regions containing an image of a hand;

locating extreme concave and convex curvature values on the corresponding boundary of said identified one region and defining said concave curvature values as valleys and said convex curvature values as peaks;

determining a count of the defined peaks and valleys and correlating the count with prestored data associated with one of a plurality of predetermined hand gestures to identify in the one region of the current video frame a particular one of the plural hand gestures present in the current video frame; and utilizing the identified hand gesture for operating the computer to perform a computer function associated with the identified hand gesture.

2. The method of claim 1, wherein said current video frame is comprised of a plurality of pixels each having an intensity value, and wherein said defining step comprises calculating one of a difference and an absolute difference between the intensity value of each pixel at a specific location and a reference value at said specific location to provide a calculated value for each pixel, and comparing the calculated value to a threshold constant.

3. The method of claim 2, wherein said video signal comprises a current frame and a previous-in-time frame, wherein said previous-in-time frame is comprised of a plurality of pixels each having an intensity value, and wherein said reference value comprises the intensity value of a pixel in said previous-in-time frame having said specific location.

4. The method of claim 1, wherein said video signal comprises a current frame and a previous-in-time frame, with each of said frames comprised of pixels having color values and wherein said defining step comprises grouping pixels having similar color values into common regions.

5. The method of claim 1, wherein each of the corresponding boundaries has a length, and wherein said screening step comprises comparing the boundary lengths to a preset range and selecting a boundary having a length within said preset range as the boundary of said identified one region.

6. The method of claim 1, wherein said determining step comprises detecting, in said defined region containing an image of a hand, an index finger and using the peak closest to said detected index finger to identify said particular one of the plural hand gestures.

7. A method of controlling a computer using images of predetermined hand gestures identified in frames of a video signal, comprising the steps of:

inputting to a processor a current video frame of a video signal containing a frame image;

defining a plurality of regions in the current video frame image with each defined region being represented by a corresponding boundary of pixels;

screening each of the corresponding boundaries of the defined regions to identify one of said defined regions containing an image of a hand;

locating extreme concave and convex curvature values on the corresponding boundary of said identified one region and defining said concave curvature values as valleys and said convex curvature values as peaks;

determining a count of the defined peaks and valleys and correlating the count with prestored data associated with one of a plurality of predetermined hand gestures to identify in the one region of the current video frame a particular one of the plural hand gestures present in the current video frame, said determining step comprising detecting, in said defined region containing an image of a hand, an index finger and using the peak closest to said detected index finger to identify said particular one of the plural hand gestures; and utilizing the identified hand gesture for operating the computer to perform a computer function associated with the identified hand gesture.

8. The method of claim 7, wherein said current video frame is comprised of pixels each having an intensity value, and wherein said defining step comprises calculating one of a difference and an absolute difference between the intensity value of each pixel at a specific location and a reference value at said specific location to provide a calculated value for each pixel, and comparing the calculated value to a threshold constant.

9. The method of claim 8, wherein said video signal comprises a current frame and a previous-in-time frame, wherein said previous-in-time frame is comprised of a plurality of pixels each having an intensity value, and wherein said reference value comprises the intensity value of a pixel in said previous-in-time frame having said specific location.

10. The method of claim 7, wherein said video signal comprises a current frame and a previous-in-time frame, with each of said frames comprised of pixels having color values and wherein said defining step comprises grouping pixels having similar color values into common regions.

11. The method of claim 7, wherein each of the corresponding boundaries has a length, and wherein said screening step comprises comparing the boundary lengths to a preset range and selecting a boundary having a length within said preset range as the boundary of said identified one region.

12. A device for controlling a computer using images of objects identified in frames of a video signal, comprising:

a processor;

means for inputting a current video frame of a video signal containing a frame image to said processor;

defining means for defining a plurality of regions in the current video frame image with each defined region being represented by a corresponding boundary of pixels;

screening means for screening each of the corresponding boundaries of the defined regions to identify one of said defined regions containing an image of an object;

locating means for locating extreme concave and convex curvature values on the corresponding boundary of said identified one region and defining said concave curvature values as valleys and said convex curvature values as peaks;

determining means for determining a count of the defined peaks and valleys and comparing the count with prestored data associated with one of a plurality of objects to identify in the one region of the current video frame a particular one of the objects present in the current video frame; and controlling means for utilizing the identified object for operating the computer to perform a computer function associated with the identified object.

* * * * *